(12) United States Patent
Skog et al.

(10) Patent No.: US 12,416,553 B2
(45) Date of Patent: Sep. 16, 2025

(54) THERMAL DESORPTION PRECONCENTRATOR ADAPTED FOR SPECTROSCOPIC GAS ANALYSIS

(71) Applicant: Picarro, Inc., Santa Clara, CA (US)

(72) Inventors: Kai M. Skog, San Jose, CA (US); James M. Hamilton, Sunnyvale, CA (US); Chris W. Rella, Sunnyvale, CA (US); Bruce A. Richman, Sunnyvale, CA (US); Elizabeth R. Schemm, Woodside, CA (US); Rebecca Wernis, Fremont, CA (US)

(73) Assignee: Picarro, Inc., Santa Clara, CA (US)

( * ) Notice: Subject to any disclaimer, the term of this patent is extended or adjusted under 35 U.S.C. 154(b) by 241 days.

(21) Appl. No.: 18/225,012

(22) Filed: Jul. 21, 2023

(65) Prior Publication Data
US 2025/0027856 A1    Jan. 23, 2025

(51) Int. Cl.
*G01N 1/40* (2006.01)
*G01N 1/44* (2006.01)
(Continued)

(52) U.S. Cl.
CPC ............ *G01N 1/405* (2013.01); *G01N 1/44* (2013.01); *G01N 21/31* (2013.01);
(Continued)

(58) Field of Classification Search
CPC .......... G01N 1/405; G01N 1/44; G01N 21/31; G01N 21/3504; G01N 21/39;
(Continued)

(56) References Cited

U.S. PATENT DOCUMENTS 5,142,143 A * 8/1992 Fite .................... G01N 33/0049
73/864.81
2012/0270334 A1* 10/2012 Ojeda ..................... H01J 49/26
436/178

(Continued)

OTHER PUBLICATIONS

Rydosz, A et al. "The gas micropreconcentrators in LTCC and MEMS technologies for breath acetone analysis," 2012 IEEE Electrical Design of Advanced Packaging and Systems Symposium (EDAPS), Taipei, Taiwan, 2012, pp. 231-234 (Year: 2012).*

(Continued)

*Primary Examiner* — Michael A Lyons
(74) *Attorney, Agent, or Firm* — LUMEN PATENT FIRM

(57) ABSTRACT

Improved gas sample preprocessing is provided for scanning optical spectroscopic analysis instruments by tailoring characteristic gas handling times to the scan time $T_s$ of the analysis instrument. In particular, for sample preconcentration, the desorption duration $T_d$ of the sample preconcentrator should be $\geq 2T_s$. For gas chromatography, the elution duration $T_e$ of relevant eluted species should be $\geq 2T_s$. This advantageously avoids having significant changes in the gas sample within the analysis instrument as a scan is being performed.

36 Claims, 6 Drawing Sheets

(51) Int. Cl.
*G01N 21/31* (2006.01)
*G01N 21/3504* (2014.01)
*G01N 21/39* (2006.01)

(52) U.S. Cl.
CPC ......... *G01N 21/3504* (2013.01); *G01N 21/39* (2013.01); *G01N 2021/399* (2013.01)

(58) Field of Classification Search
CPC .............. G01N 2021/399; G01N 30/02; G01N 2030/025; G01N 2030/022
See application file for complete search history.

(56) References Cited

U.S. PATENT DOCUMENTS

| 2015/0289782 | A1 | 10/2015 | Peverall | |
|---|---|---|---|---|
| 2019/0195786 | A1* | 6/2019 | Spartz | G01N 30/00 |
| 2020/0049673 | A1* | 2/2020 | Lim | G01N 30/30 |
| 2022/0365052 | A1* | 11/2022 | Gentner | G01N 1/00 |
| 2025/0027918 | A1* | 1/2025 | Richman | G01N 30/88 |

OTHER PUBLICATIONS

Pradhan, Manik et al. "Automated System for Monitoring Trace C2H2 in Ambient Air by Cavity Ring-Down Spectroscopy Combined with Sample Preconcentration". Environmental Science & Technology, vol. 42, Issue 19, 2008, pp. 7354-7359. (Year: 2008).*

Rivera-Barrera et al., "Thermal desorption of trimethylphosphine (TMP) on the HY zeolite followed by FT-IR and 31P MAS NMR", 2021, Journal of Solid State Chemistry 294 121862.

Pogodina et al., "Combination of Sorption Tube Sampling and Thermal Desorption with Hollow Waveguide FT-IR Spectroscopy for Atmospheric Trace Gas Analysis . . . " 2004, Anal. Chem. 76, 464-468.

* cited by examiner

THERMAL DESORPTION PRECONCENTRATOR ADAPTED FOR SPECTROSCOPIC GAS ANALYSIS

FIELD OF THE INVENTION

This invention relates to gas sample preprocessing for scanning spectroscopic gas analysis instruments.

BACKGROUND

Volatile Organic Compounds (VOCs) represent an important class of compounds in a variety of settings and applications. There are thousands of distinct organic compounds that have a sufficiently low boiling point that they volatilize into the gas phase at concentrations that can affect industrial processes or can adversely affect human health. In some cases, the concentrations at which their effects become important can be parts-per-billion or even parts-per-trillion levels.

Despite their ubiquity and importance, there are very few instrument technologies capable of measuring the concentrations of each species of VOCs in a gas sample, such as ambient air, at parts-per-trillion levels. There are three major technologies that are generally applied to the quantification of VOCs in the gas phase:
1) Mass spectrometry (MS)—VOCs are detected by ionization and speciated by mass/charge ratio (or more accurately, fragment mass/charge ratio).
2) Fourier Transform Infrared Spectroscopy—VOCs are both detected and species identified by infrared absorption spectroscopy.
3) Gas chromatography—VOCs are detected typically by ionization and species identified by their boiling points. Because GC is a separation technology, it is often partnered with a detection technology such as MS which provides additional species identification vs mass.

We focus now on the GC capability. The separation by boiling point is generally accomplished by injecting a very short pulse (seconds) of a mixture of VOCs into an inert carrier gas (e.g., nitrogen, helium, or hydrogen), and then passing this pulse through a long "column" (typically a tube) coated with a so-called "stationary phase," which is a material which retains higher boiling point compounds longer than lower boiling point compounds. Thus, the initial pulse is separated into multiple pulses at the end of the GC column, which can then be detected either via a simple ionization process (e.g., a flame ionization detector, or FID), or with a mass spectrometer which can provide more specific species identification capability, in addition to detection.

Employing GC separation to aid in species identification is a powerful technique, but because the sample is diluted into a carrier gas, it is frequently the case that the ultimate detection limit of GC systems is at the parts-per-million (ppm) or high ppb level, which is not low enough for many important VOC measurement applications. In these cases, it is common to employ a sample pre-concentrator, a device which increases the concentration of the target VOCs in the sample delivered to the GC system. There are multiple ways to accomplish this sample pre-concentration. A common way is to collect the target VOCs onto a cold finger and/or high surface area polymer, which traps the VOCs via physio-adsorption but does not trap the other inert compounds (for example, molecular nitrogen and oxygen). The input gas sample is passed through this trap, collecting VOCs and passing inert gases. When sufficient sample is trapped, the trap is heated, releasing the VOCs into a clean carrier gas to be delivered into the GC system. In this way, the effective detection limit of the GC+pre-concentration system can be lowered to the ppb and even ppt levels.

There are five critical attributes necessary for building a pre-concentrator for a GC-based VOC detection system:
1) The pre-concentration system must be able to repeatably trap a wide range of target VOCs while passing inert and nuisance compounds.
2) The total mass of VOCs in the pulse must be sufficient such that the desired ppt concentration levels can be detected at the downstream end of the GC. For ionization based detectors such as FID (flame ionization detection) or MS, this amount of sample is fairly low, requiring less than 1 cc (0.001 liter) of sample to make a measurement. Typically, it is sufficient to pass 1-10 liters of sample gas through the pre-concentration system to get enough sample to make ppt measurements of VOCs.
3) To take full advantage of the species identification capability of the GC system, the pre-concentration system must be able to release ALL the trapped VOCs in a VERY short pulse (typically seconds).
4) Given that the VOCs are typically released via a thermal process, the engineering challenges of building such a pre-concentrator are significant. In fact, it is common when designing pre-concentration systems to do this in two stages, where the first stage is designed to capture the target compounds while passing nuisance compounds like water vapor or CO2, but where the pulse is longer than is required for GC analysis, and the second stage is a small trap designed to capture the target compounds and release them quickly.
5) The pre-concentration trapping process cannot take an unreasonably long time (<1 hour, e.g.)

Commercial GC-FID or GC-MS systems commonly come with integrated pre-concentration as a front end. In fact, multiple suppliers provide pre-concentration front-ends intended to be integrated with GC systems from other suppliers. In other words, sample pre-concentration is a technology that is routinely integrated as a front end to GC systems.

We now turn our attention to FTIR. In FTIR, the absorption spectrum is used to quantify and identify the constituent VOC species in a gas sample. The ability of FTIR to measure simultaneously the concentration of each VOC species at ppm and sub-ppm levels is well-established and well documented. While this level of sensitivity is sufficient for some applications, it is not sufficient for a large subset of potential applications. It is natural to wonder whether the sample pre-concentration methods employed as a front-end for GC analysis could similarly be applied to FTIR analysis.

To act as an effective pre-concentration front end for FTIR, there are just three critical attributes:
1) The pre-concentration system must be able to repeatably trap a wide range of target VOCs.
2) The total mass of VOCs in the pulse must be sufficient such that the desired ppt concentration levels can be detected in the FTIR.
3) The pre-concentration trapping process cannot take an unreasonably long time (<1 hour, e.g.).

These three requirements taken together present a nearly insurmountable engineering challenge. Because FTIR uses incoherent light sources and requires long path lengths for good sensitivity, the sample volume required for a good FTIR measurement tends to be 1 liter or more. This means that to pre-concentrate by a factor of 1000 (which is required to improve the sensitivity from sub-ppm to sub-ppb), one would need to pass 1000 liters of sample gas through the pre-concentration system WITHOUT losing target VOC compounds, or 100 times more than is typically achieved in GC pre-concentrators. The practical considerations of providing sufficient flow, adsorption surface area, and thermal control to deliver practical pre-concentration is daunting. To date we have not been able to identify any commercially available pre-concentration systems for FTIR analyzers, which we believe is due to these practical engineering challenges.

Accordingly, it would be an advance in the art to provide improved sample preprocessing for spectroscopic gas analysis.

SUMMARY

Recent laser-based spectrometer developments have resulted in a fundamentally new method for measuring VOCs, based on a technology called Broadband Cavity Ring Down Spectroscopy (BB-CRDS). This technology is analogous to FTIR, in the sense that infrared absorption spectroscopy is used both to identify species and to quantify them. However, there are two fundamental differences between FTIR and BB-CRDS that dramatically impact the design of a sample pre-concentrator:

1) BB-CRDS has a native sensitivity that is about 100 times better than FTIR: single digit ppb vs. ppm; and
2) BB-CRDS can measure much smaller samples—about 0.01 liters, vs 1 liter for FTIR.

As a result of these significant performance advantages, the design of a practical pre-concentrator for BB-DRDS is dramatically simplified from what would be required for an FTIR sample pre-concentrator. In particular, we note that sample pre-concentration of 1-10 L of sample is sufficient for pre-concentration to ppt detection limits for most compounds.

In fact, because BB-CRDS can itself both identify and detect (quantify) VOC species, a GC front end is not required. That means that, unlike for a GC pre-concentrator, there is no requirement that the VOCs be released in a very short pulse. It need only be short enough such that the concentration is elevated in the instrument, which is a much less stringent criterion. In fact, it is desirable to have gas pulse that is longer than the spectral scan time of the analyzer (typically 0.5-5 seconds), meaning that a pulse length of 5-50 seconds would be optimal. This further simplification allows a further simplification from existing GC-pre-concentration modules:

1) The BB-CRDS pre-concentrator can take advantage of a wider range of materials and configuration;
2) The thermal engineering is much simpler, leading to cost reductions and performance and reliability improvements; and
3) The need for a second focusing trap is removed.

In the case of a scanning spectroscopic analysis instrument such as CRDS, the gas release duration $T_d$ from the pre-concentrator is preferably longer than the instrument scan time $T_s$ (more specifically, $T_d \geq 2T_s$). Similarly, when gas chromatography is used as an input to the scanning spectroscopic analysis instrument, the elution duration $T_e$ of each relevant eluted species is preferably longer than the instrument scan time $T_s$ (more specifically, $T_e \geq 2Ts$). Such conditions will typically lead to eluted species overlapping each other in time, which conventional gas chromatography designs strive to avoid. The scanning spectroscopic analysis instrument, however, provides species identification capability in addition to that of chromatography. Note that gas chromatography seeks to separate species by making them have different elution times, which are the times taken by each species to emerge from the column. Elution durations are the spread in time for each species around its corresponding elution time.

Cavity enhanced scanning spectroscopic analysis instruments also have a characteristic cavity filling time $T_f$. $T_f$ is preferably substantially matched to the release duration $T_d$ from the pre-concentrator or the elution duration Te of a species of interest from gas chromatography.

More specifically, the gas pulse that appears in the cavity is the convolution of the instrument response function (represented by $T_f$) and the gas preprocessor response time (represented by $T_d$ or $T_e$). To avoid spectral distortion, $T_s$ should be substantially less than this convolution time. To the extent that $T_f$ is independent of $T_d$ or $T_e$ (they're not completely independent, since the flow through the TD tube or GC column must be at least equal to the instrument flow during the desorption phase), then it is desirable to match $T_d$ or $T_e$ with $T_f$. (These times are not completely independent as the gas flow through the TD tube during desorption or GC column during elution must be at least as much as the flow through the spectroscopic analysis instrument.) If $T_f$ is shorter than $T_d$ or $T_e$, then reducing the instrument flow would allow to pre-concentrate the sample to a higher value, provided that such action does not affect $T_d$ or $T_e$. Conversely, if $T_f$ is longer than $T_d$ or $T_e$, then the effective peak concentration is reduced, thus reducing the maximum concentration achievable. In the GC system, you also add broadening to the pulse, which reduces the compound selectivity afforded by the GC separation.

These characteristic times can be defined in various ways. For example, a desorption duration can be defined as a characteristic length of time of a gas pulse emitted from a sample pre-concentrator. For example, a full-width half-maximum FWHM of this gas pulse can be used as "Td", where the FWHM is determined directly from experimental data, or is determined from a curve fit to experimental data. Such a curve fit can assume any reasonable shape for the gas pulse, such as a Gaussian, Lorentzian, or Cauchy-Gaussian (symmetric or asymmetric). The elution duration $T_e$ from a gas chromatography can be defined similarly.

The scan time $T_s$ and the cavity filling time $T_f$ are easier to define. The scan time $T_s$ is the time taken by the instrument to gather the data for a single measured spectrum. If the instrument is operating in a constant gas flow rate mode, then the filling time $T_f$ is the cavity volume divided by the gas flow rate, assuming the cavity pressure is the same as the gas flow pressure. If the pressures are different, then a correction is applied so that the cavity filling time is the time it takes to replace the contents of the cavity.

In this work, we describe a pre-concentrator based on thermal desorption (TD), a common type of pre-concentrator. The disclosed pre-concentrator has the desirable properties for combination with either ordinary laser-based spectroscopies (TDLAS) or cavity enhanced spectroscopies (CEAS) such as CRDS, ICOS, OA-ICOS, or OF-CEAS: relative simplicity, broad range of VOCs, short (<1 hour) collection time, long pre-concentrated pulse (10 seconds to minutes), ppt detection sensitivity when combined with CEAS. We also describe that performing the thermal desorption slowly, can provide partial separation of species, similar to GC but less complete.

Other optional aspects of our implementation include:
1) multiplexing multiple sampling locations into a single TD unit and CRDS analyzer.
2) increasing the duty cycle by multiplexing TD units with a single CRDS gas analyzer;
3) flow control methods; and
4) simultaneous measurement by CRDS during TD adsorption.

DETAILED DESCRIPTION

A) General Principles

A1) Introduction

Figure 1:
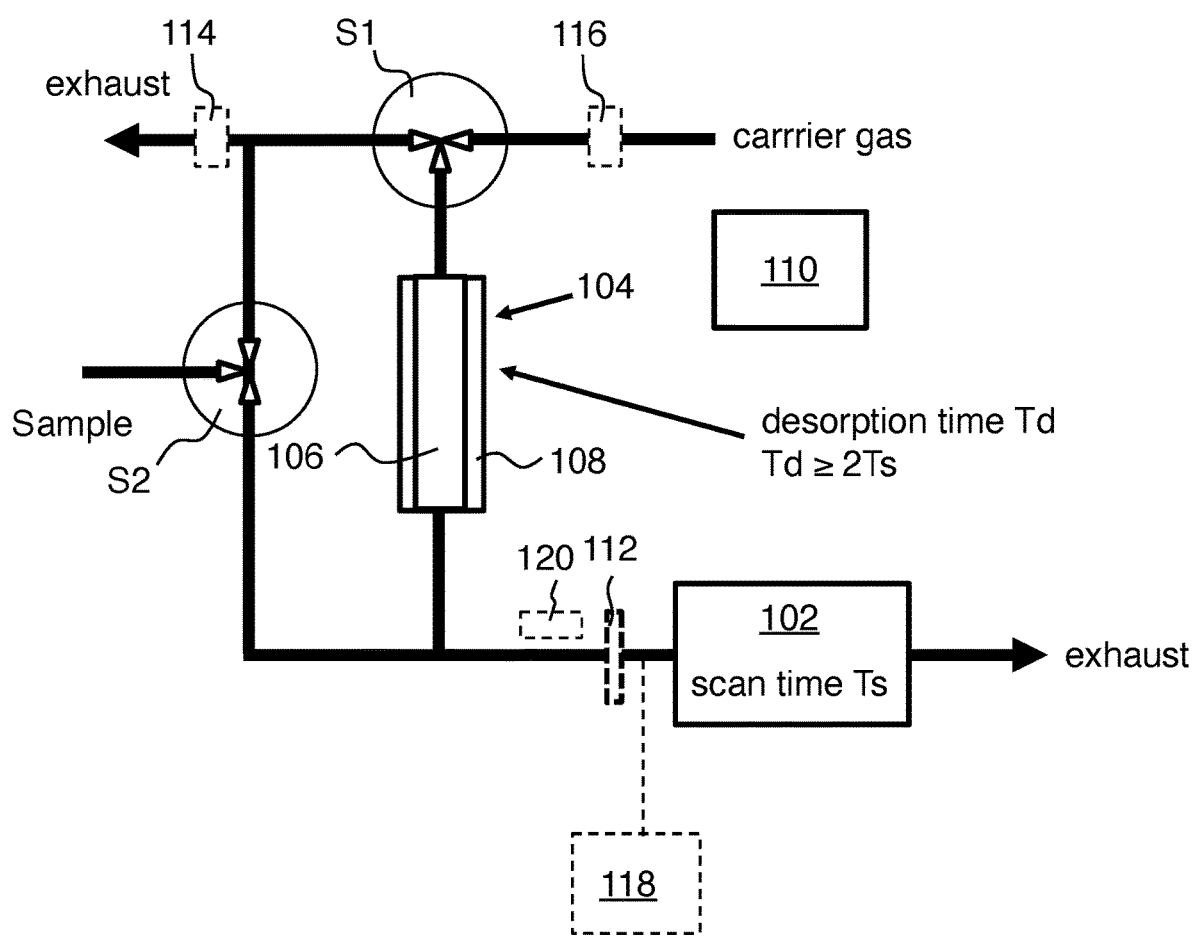
FIG. 1 shows an exemplary embodiment of the invention including a sample preconcentrator.

Conventional gas sample preprocessing (e.g., preconcentration) for analysis tends to have rapid release of preprocessed gas into the analysis instrument as a design principle. This is especially true when gas chromatography is used for species identification. However, we have found that when the analysis instrument is a scanning spectroscopic analysis instrument, it is preferred for the gas release from the preprocessing to be slower than the instrument scan time.

We have also found that when gas chromatography is used as an input to the scanning spectroscopic analysis instrument, it is preferred that the elution duration of each relevant eluted species be longer than the instrument scan time. Typically this will lead to eluted species overlapping each other in time, which conventional gas chromatography designs strive to avoid. Here that's not a problem because of the identification capability provided by the scanning spectroscopic analysis instrument. Note that gas chromatography seeks to separate species by making them have different elution times, which are the times taken by each species to emerge from the column. Elution durations are the spread in time for each species around its corresponding elution time.

A2) Exemplary Embodiments

A2a) Preconcentration Embodiments

In this section, some exemplary embodiments are summarized. These examples are apparatus embodiments, and each of these apparatus embodiments has a corresponding method of operation embodiment.

A first embodiment is apparatus for performing gas analysis, the apparatus including:
1) a gas analysis instrument based on optical absorption spectroscopy, where the gas analysis instrument performs a spectral scan in a scan time $T_s$;
2) a sample preconcentrator having an adsorption mode and a desorption mode; and
3) a controller configured to at least switch between the adsorption mode and desorption mode of the sample preconcentrator.

The adsorption mode includes receiving an input gas sample and adsorbing one or more constituents of the input gas sample to collect one or more adsorbed species, and the desorption mode includes heating the sample preconcentrator to release at least some of the one or more adsorbed species to provide a preprocessed gas sample. The preprocessed gas sample is provided to the gas analysis instrument in a desorption time $T_d$, where $T_d$ is at least $2T_s$.

The desorption time $T_d$ can be controlled by controlling a temperature ramp rate of the desorption mode.

The apparatus can be configured to provide enhanced concentration of an analyte species to the gas analysis instrument with the sample preconcentrator. The apparatus can be configured to reduce concentrations of one or more interfering gas species provided to the gas analysis instrument using the sample preconcentrator.

The gas analysis instrument can be based on a spectroscopy selected from the group consisting of: cavity enhanced absorption spectroscopy, optical-feedback cavity enhanced absorption spectroscopy, cavity ring-down spectroscopy, tunable diode laser absorption spectroscopy, integrated cavity output spectroscopy, and off-axis integrated cavity output spectroscopy.

The sample preconcentrator can include an adsorption/desorption medium selected from the group consisting of: porous polymers, graphitized carbons and carbon molecular sieves.

The adsorption mode can include cooling part or all of the sample preconcentrator to enhance adsorption of the one or more adsorbed species.

The apparatus can be configured to measure input sample gas during the adsorption mode with the gas analysis instrument.

The apparatus can further include one or more additional gas detectors configured to receive gas from the sample preconcentrator. Alternatively, the additional gas detectors can receive gas from the gas analysis instrument.

The apparatus can be configured to provide one or more further sample preconditioning operations selected from the group consisting of: ozone removal, humidity removal, and selective removal of one or more interfering species with gas-selective membranes.

The apparatus can further include one or more additional sample preconcentrator, where the controller is configured to connect an input of the gas analysis instrument to the sample preconcentrator or to any of the one or more additional sample preconcentrators, thereby providing multiplexing.

The apparatus can include one or more devices that measure gas flow. Alternatively, mass flow controllers can be used to both measure and actively control gas flow, but that's often not necessary. The apparatus may include one or more fixed gas flow restrictions to provide gas flow control.

The controller can be configured to provide one or more carrier gases for sample handling. The controller can be configured to provide one or more calibration gases to the sample preconcentrator.

The controller can be configured to bypass a sample input to an exhaust line except during the adsorption mode, and can be configured to provide the sample input to the sample preconcentrator during the adsorption mode.

A gas line connecting the sample preconcentrator to the gas analysis instrument can be heated, which can help alleviate the following issue. In some applications, the boiling point of the compounds in the gas stream can be very high (above 200 C). These compounds tend to adhere to sample manifold surfaces, especially downstream of the sample preconcentrator or gas chromatography unit, where concentrations are higher, and where we want to have clean surfaces to prevent sample carry-over from measurement to measurement. For this reason, it is often important to heat the sample handling manifold between the sample pre concentrator and the gas analyzer. Sample carryover can also be reduced by appropriate selection of wetted materials that discourage sample adhesion. Common materials solutions are polymer tubing or polymer-coated tubing, especially PTFE (Polytetrafluoroethylene) or PFA (perfluoroalkoxy). Electropolished stainless steel, optionally coated with coatings to discourage compound adhesion (e.g., Silconert, fluoropel), is a good option.

The controller can provide a pressurized sample inlet, which can help alleviate the following issue. In most cases, the inlet gas is at ambient pressure, and the sample preconcentrator or gas chromatography unit can pull the gas it needs from reservoir of gas. However, in some applications, it is desirable to measure gases that are at sub-ambient pressure. In this case, a gas compressor can be used to boost the pressure of the sample gas to a level more suitable for the sample preconcentrator, gas chromatography unit, or spectroscopic instrument. It should be noted that gas compressors can in principle contaminate the gas sample with unwanted compounds, so care must be taken in selection of the technology.

A2b) Gas Chromatography Embodiments

A second embodiment is apparatus for performing gas analysis, the apparatus including:
1) a gas analysis instrument based on optical absorption spectroscopy, where the gas analysis instrument performs a spectral scan in a scan time $T_s$;
2) a gas chromatography unit having at least an elution mode; and
3) a controller configured to at least control the elution mode.

The elution mode includes receiving an input gas sample and at least partially time-separating one or more constituents of the input gas sample to provide an eluted gas sample, where at least one species in the eluted gas sample is provided to the gas analysis instrument during an elution duration $T_e$, where $T_e$ is at least $2T_s$.

At least two species in the eluted gas sample may have different elution times that aid their identification.

The apparatus can further include a sample preconcentrator configured to provide the input gas sample to the gas chromatography unit.

The gas chromatography unit can includes a separator selected from the group consisting of: capillary tubes, packed columns, and thermal desorption tubes acting as gas species separators.

The gas analysis instrument can be based on a spectroscopy selected from the group consisting of: cavity enhanced absorption spectroscopy, optical-feedback cavity enhanced absorption spectroscopy, cavity ring-down spectroscopy, tunable diode laser absorption spectroscopy, integrated cavity output spectroscopy, and off-axis integrated cavity output spectroscopy.

The apparatus can further include one or more additional gas detectors configured to receive gas from the gas chromatography unit.

The apparatus can be configured to provide one or more further sample preconditioning operations selected from the group consisting of: ozone removal, humidity removal, and selective removal of one or more interfering species with gas-selective membranes.

The apparatus can further include one or more additional gas chromatography units, where the controller is configured to connect an input of the gas analysis instrument to the gas chromatography unit or to any of the one or more additional gas chromatography units, thereby providing multiplexing.

The apparatus can include one or more devices that measure gas flow. The apparatus can include one or more fixed gas flow restrictions to provide gas flow control. The controller can be configured to provide one or more carrier gases for sample handling.

The controller can be configured to provide one or more reference gas species to an input of the gas chromatography unit. One or more elution times of the one or more reference gas species through the gas chromatography unit can be used to estimate at least one elution time of the at least one gas species in the gas sample. One or more concentrations of the one or more reference gas species can be used to estimate at least one concentration of the at least one gas species in the gas sample. Such calibration gases are very useful in gas chromatography, not only to verify the recovery of the compounds in the system, as in the sample preconcentrator, but to set a scale for the elution time for different gas species. The exact elution time of different compounds can depend on thermal gradients, gas flow, carrier gas, chromatographic column materials, and the age and contamination of the column. By periodically feeding the system a gas containing one or more known reference species, the uncertainty of the expected elution times for different compounds present in the gas sample can be reduced, improving compound identification and even quantification, by reducing the temporal degree of freedom needed during the analysis of the resulting chromatogram. If the concentrations of the reference gases are known, then an additional reduction of quantification uncertainty can be achieved.

The controller can have a sample intake mode, where the controller is configured to provide the input gas sample to the gas chromatography unit during the sample intake mode, and where the controller is configured to bypass the input gas sample to an exhaust line except during the sample intake mode.

A gas line connecting the gas chromatography unit to the gas analysis instrument can be heated. The controller can provide a pressurized sample inlet. Motivations for these options are described above.

The controller can also have a direct measurement mode in which input sample gas is measured directly with the gas analysis instrument, without passing the input sample gas through the gas chromatography unit.

B) Detailed Examples

FIG. 1 shows an exemplary embodiment of the invention. Here 102 is the gas analysis instrument, 104 is the sample preconcentrator (e.g., it can be a thermal desorption tube 106 combined with a heater/cooler 108), 110 is the system controller, S1 and S2 are gas flow control switches, 112 is an optional particle filter, 114 and 116 are optional mass flow controllers, 118 schematically shows one or more additional gas detectors, and 120 is an optional heater for the gas line leading to the gas analysis instrument. As indicated above, the desorption time $T_d$ from sample preconcentrator 104 is related to the scan time $T_s$ of analysis instrument 102 as follows: $T_d \geq 2T_s$.

Some basic operating modes are as follows. In the adsorption mode, S1 connects sample preconcentrator 104 to exhaust and S2 connects sample preconcentrator 104 to the sample input (with no vacuum on gas analysis instrument 102). In the desorption mode, S1 connects sample preconcentrator 104 to the carrier gas source and S2 connects sample preconcentrator 104 to gas analysis instrument 102. In an optional direct measurement mode for the adsorption mode, vacuum can be present on gas analysis instrument 102 to perform measurements in the adsorption mode. In an optional bypass mode S2 connects the sample input to vacuum while sample preconcentrator 104 is desorbing sample into the gas analysis instrument.

Further consideration relating to the example of FIG. 1 follow. The central component is the thermal desorption (TD) tube 106, contained inside a heater module 108. The TD tube can be a metal or glass tube, often approximately ¼ inch in outer diameter and 3.5 inches or 7.0 inches long. It can be partially filled with adsorbent material, for which relevant gas species have a significant affinity at low temperatures (e.g. 30 C or colder), and a low affinity at high temperatures (e.g. 100 C or hotter). With this property, a large volume of sample gas is flowed through the TD tube at low temperature so as to collect relevant species on the adsorbent (the "trapping" phase), and then a small volume of clean carrier gas (e.g. Nitrogen, Argon, or Helium) is flowed through the TD tube while at high temperature to release the adsorbed species into the carrier gas (the "desorption phase), but at a substantially higher concentration than was in the original sample gas. This high-concentration flow passes to the scanning spectroscopic analysis instrument 102, with an optional gas filter 112 upstream to prevent particulate matter or a sub-class of gas species from contaminating the gas analyzer or interfering with its measurement. This "pre-concentration" permits the instrument to measure the concentrations of the species whereas the concentrations in the original sample gas may be below the detection limit of the instrument. The concentration in the original sample gas equals the concentration measured in the pre-concentrated gas multiplied by the ratio of the desorption gas volume to the sample gas volume. Regardless of the detection limit, the pre-concentration improves the accuracy and precision of the measurement when converted to the concentration in the original sample gas, by (ideally) the same ratio of the gas volumes used to convert the concentration measurement.

FIG. 1 also shows the gas tubing, valves, and temperature control needed to effect the actions described in the previous paragraph. The parts include the TD tube 106 in a temperature-controlled heater module 108, a valve S2 at the sample inlet end of the TD tube, a valve S1 at the carrier inlet end of the TD tube, an optional particle filter 112, and the scanning spectroscopic analysis instrument 102. The gas transfer line from the TD tube to the instrument, including the filter, may optionally be heated (e.g., with heater 120) to prevent condensation of the pre-concentrated species in the transfer line and filter, thus improving the delivery efficiency of the species to the analyzer.

A single cycle of action typically includes the following steps (other steps are possible and some steps may be repeated in a single cycle):

a) stabilize the temperature of the TD tube to a temperature appropriate for adsorption;
b) trap (adsorb) sample in the TD tube;
c) flush TD tube with clean carrier gas;
d) ramp temperature up so as to desorb species from TD tube, and measure desorbed species with scanning spectroscopic analysis instrument;
e) hold TD tube at high temperature to continue to desorb and measure species, and clean out tube;
f) cool down TD tube in preparation for next cycle.

Further considerations relating to each of these steps follow.

Stabilize temperature: The valves S1 and S2 are both switched so that the sample gas is blocked, and the carrier gas flows through the TD tube and continues to the scanning spectroscopic analysis instrument. The temperature controller, typically an electronic proportional-integral-differential (PID) control device, adjusts power to a heater and/or cooler in the heater module as to stabilize the temperature at a specific low value to be used for trapping (adsorbing) sample species in the next step. In one possible implementation, the temperature must remain stable at the target temperature within a specified tolerance for a specified minimum time before progressing to the next step.

Trap sample: At the beginning of this step, valves S1 and S2 are switched so that the sample gas now flows into and through the TD tube and out through valve S1 and on to the vacuum pump that pulls the sample gas through the entire train. Sample species are adsorbed inside the TD tube. Trapping continues for a specified amount of time. The temperature controller continues to maintain the temperature of the TD heater module at the same set point throughout the trapping step. The trapping gas volume, the value of which is used to compute the species concentrations, is equal to the sample gas flow rate multiplied by the trapping time.

Flush TD tube: At the beginning of this step, valves S1 and S2 are switched so that the sample gas is blocked from the TD, and the carrier gas flows through the TD tube and continues to the scanning spectroscopic analysis instrument. The temperature controller continues to maintain the temperature of the TD heater module at the same set point throughout the flush step. The flush continues for a specified time (typically about one minute) to clear the remaining sample gas from the TD tube, replacing it with the carrier gas, preferably all the way to the scanning spectroscopic analysis instrument. The temperature is maintained at the same low temperature as in the trapping step.

Desorb sample: During the desorb step, the valves stay switched so that the sample gas is still blocked from the TD tube, and the carrier gas continues through the TD tube and to the scanning spectroscopic analysis instrument. The temperature controller ramps the temperature of the TD heater module starting at the trap temperature and increasing to a high temperature typically in the range 100-300 C. The set point temperature versus time is pre-programmed, either within the temperature controller by a computer communicating with the temperature controller. The temperature ramp may be fast to desorb the species quickly, or slow so that more volatile species desorb earlier (at lower temperature) than less volatile species. Although the slow TD desorption is not expected to separate the species completely in time, early times will have primarily more-volatile species, late times will have primarily less-volatile species, and intermediate times will have all species simultaneously. This partial separation reduces the strict requirement that the optical spectroscopy alone determines which species are present and their quantification.

High-temperature clean-out: At the end of the desorb step, the TD heater module temperature is at some high value. During the high-temperature clean-out step, the TD heater module is held at this same high temperature, or another high temperature for a specified amount of time. Desorption of species continues, and the valves stay in the same state so that the carrier gas flows through the TD tube and continues to the scanning spectroscopic analysis instrument. This step is typically chosen to last long enough to desorb all of the species from the TD tube, so that the TD tube is "clean", e.g. has minimal remaining species still adsorbed, that may interfere with the gas measurement of the next cycle (e.g. desorb during the next cycle). This step may occur more than once in a cycle, with additional steps having a different temperature from the initial clean-out step, optionally preceded by a temperature ramp step (similar to desorb step).

Cool down: After the clean-out step, the TD tube needs to be cooled down in preparation for the next cycle. During this step, a cooling mechanism such as a fan or thermo-electric cooler integral with the heater module is turned on to cool down the heater module and TD tube inside it. The temperature controller may regulate the dropping temperature, such as a programmed temperature ramp, or simply allow cooling as rapidly as possible. This step may have a specified time duration and the temperature controller may begin to stabilize the temperature at the low value specified in the "Stabilize temperature" step, or this step may be programmed to end when the temperature reaches a specified low temperature value (either that of the "stabilize temperature" step or another low temperature).

After the Cool down step ends, the cycle begins anew with the Stabilize temperature step. Cycles continue until the user or computer instructs the cycles to stop, either immediately or at the end of a current cycle. If instructed to stop immediately, the valves and temperature controller are put in an idle state, equivalent to the Stabilize temperature step, but without temperature control and with the heater module turned off.

The above description of cycle steps is merely an example. Depending on specific needs of the application, the above defined steps (with same or different timing or temperature or other parameters) may be added or deleted, rearranged, or new types of steps defined and inserted. For example, the first clean out step may be followed by an additional ramp step and clean out step, or there may be two or more trapping steps drawing from different incoming samples.

Some optional additions exist to the design and operation of the invention. The most basic is flow control for the gases. Flow control may be implemented with a mass flow controller (MFC), an active device that monitors the flow and adjusts it continuously, or a flow orifice, a passive device through which the flow is set by the input and output pressure conditions for the orifice. Under choke flow conditions, or for critical orifices, the flow is relatively insensitive to small pressure changes on the inlet or outlet of the orifice. Flow control by either of these methods (or any other flow control method) may be applied to either or both the sample flow during trapping and the carrier gas flow during desorption. In addition, to maintain a fresh, real-time delivery of sample gas to the invention, the invention may include a bypass gas line to direct the incoming sample to exhaust during all cycle steps other than trapping. This bypass flow may also have flow control, and this flow control may be the same device as used for the trapping flow control, achieved with appropriate gas valves.

The example of FIG. 1 includes the sample bypass line, MFC 114 for control of the trapping and sample bypass flows, and MFC 116 for controlling desorption flow. If MFC 114 is present, the trapping volume equals the flow it measures multiplied by the trapping time. In the case of the bypass flow, valve S2 connects the sample to vacuum via MFC 114 while desorbed gas flows from sample preconcentrator 104 to gas analysis instrument 102.

Another embodiment supplies a known quantity of a chosen compound into the sample flow to quantify variability in analyte recovery for more accurate quantification. The compound (1) should be a gas-phase VOC under typical measurement conditions that is able to be collected on the adsorbent bed and detected by the analyzer and (2) should not be present in the ambient environment from which the sample is being collected. The compound may either be mixed into the incoming sample flow during the trap sample step, or an additional step may be added in a second trap step immediately after the trap sample step in which the reference compound is sampled exclusively. In either case, the reference compound is desorbed and sent to the gas analyzer along with compounds collected from trap sampling.

Sample preconditioning may be added to the sample inlet for applications that require the removal of specific species, e. g. ozone or humidity, to prevent chemical reactions on the adsorbent bed or to reduce interference with measurement of other species. Ozone removal may be achieved through use of a selective reducing agent such as sodium thiosulfate applied to a quartz filter in line with the sample flow. Regular filter replacement is necessary to prevent consumption of the reducing and ozone breakthrough. Humidity can be removed or reduced with a selective membrane such as Nafion™, in which the sample flows across the membrane (or through a tube made of the membrane), and a dry carrier gas (or carrier gas lacking the selectively removed species) or vacuum on the other side of the membrane draws the excised humidity or other selectively removed species away.

Another embodiment uses a pump or other mechanism of pressure upstream of the TD tube to push the sample gas through the invention instead of a vacuum at the exit pulling the gas through.

The embodiments of the previous paragraphs may also be expanded, with the same sample incident on multiple TD tube channels, each with a different absorbent within, to improve trapping efficiency of multiple species within the sample, and to desorb to the scanning spectroscopic analysis instrument separately or simultaneously.

In another embodiment, two or more TD tubes with different adsorbent within are connected in series for trapping. Then they can be desorbed to the gas analyzer separately or simultaneously. This also has the advantage of improving trapping efficiency of multiple species within the sample.

Yet another embodiment of the invention multiplexes two or more different sample gas lines (channels) to a single TD tube. A controller, such as a computer, selects each incoming sample line to trap in the TD tube in a sequence, either pre-defined or defined in real-time according to prior information, such as measurement results from prior channels or human user input.

Figure 2:
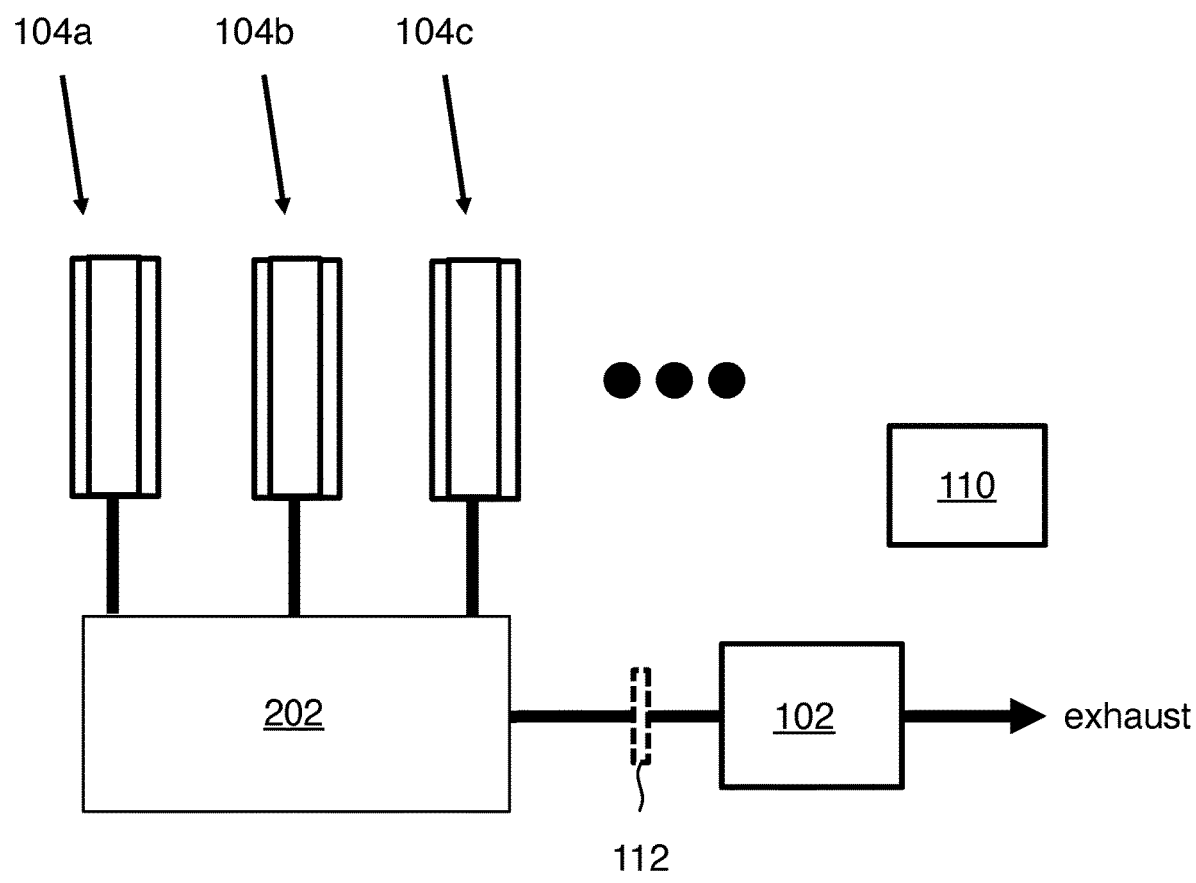
FIG. 2 show an example of multiplexing the embodiment of FIG. 1.

Another variation of multiplexing allows one gas analysis instrument to make use of several sample preconcentrators. The sample preconcentrators can have the same gas sample input, distinct gas sample inputs or any combination of same and distinct gas sample inputs. FIG. 2 shows an example. Here 104a, 104b, 104c etc. are sample preconcentrators, and gas flow manifold 202 can switch the gas flows to connect gas analysis instrument 102 to any of these sample preconcentrators. The remainder of the gas plumbing is not shown here, since the principles of this plumbing are shown on FIG. 1.

Figure 3:
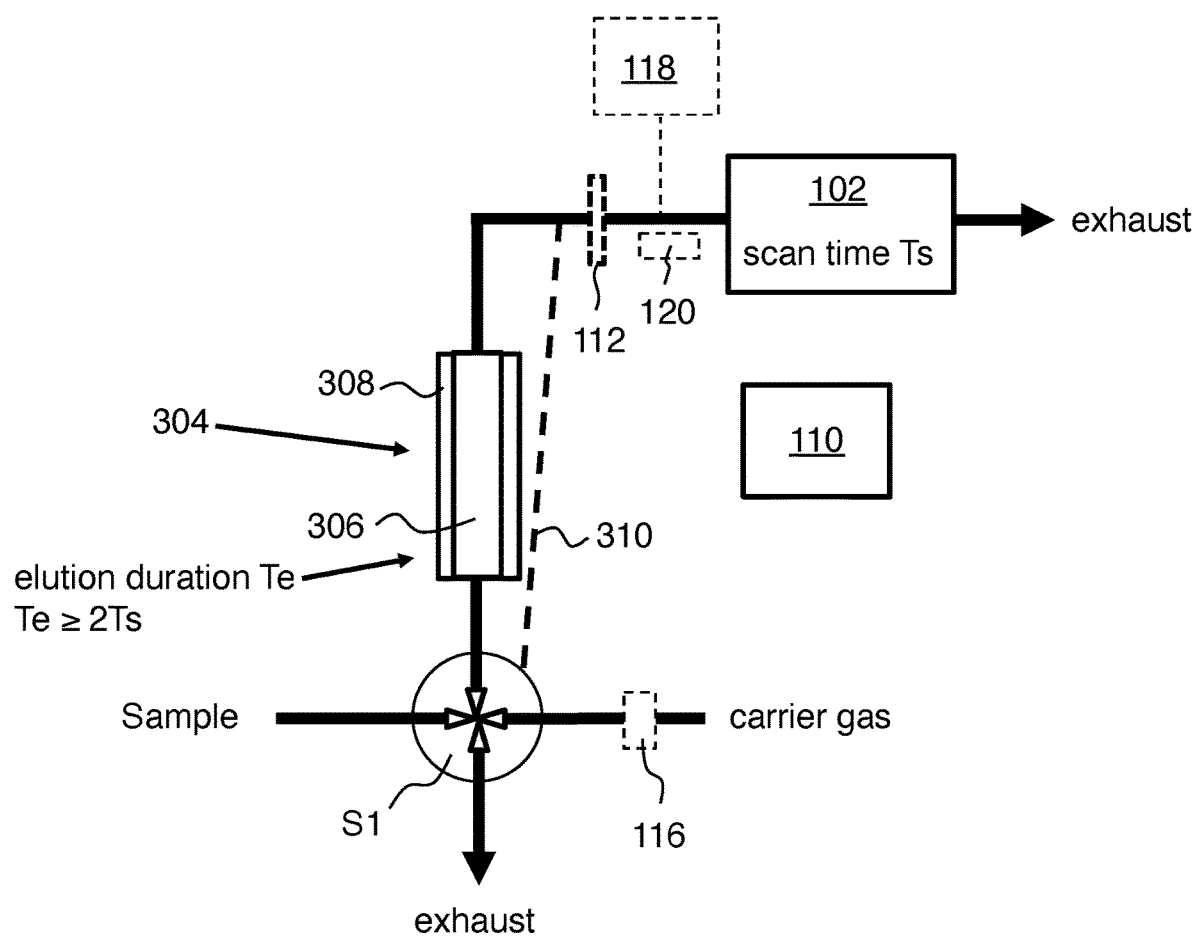
FIG. 3 shows an exemplary embodiment of the invention including a gas chromatography unit.

FIG. 3 shows another embodiment of the invention. Here 102 is the gas analysis instrument, 304 is the gas chromatography unit (e.g., it can be a gas chromatography column 306 combined with a heater/cooler 308), 110 is the system controller, S1 is a gas flow control switch, 112 is an optional particle filter, 116 is an optional mass flow controller, 118 schematically shows one or more additional gas detectors, and 120 is an optional heater for the gas line leading to the gas analysis instrument. As indicated above, the elution duration $T_e$ gas chromatography unit 304 is related to the scan time $T_s$ of analysis instrument 102 as follows: $T_e \geq 2T_s$.

Some basic operating modes are as follows. In the injection mode, S1 connects gas chromatography unit 304 to the sample input. In the elution mode, S1 connects chromatography unit 304 to the carrier gas source. Optionally, S1 can connect the sample source to the exhaust in the elution mode. In an optional direct measurement mode, S1 can connect the sample input to gas analysis instrument 102 via gas line 310. Further considerations relating to this example follow.

The optical spectroscopy of the scanning spectroscopic analysis instrument is very powerful in identifying and quantifying different species within a mixture. However, as the number of species in a mixture increases, identifying and quantifying all of the species correctly becomes increasingly difficult because spectra of many species are similar to each other, and therefore difficult to distinguish. Mathematically, analyzing the spectrum of the mixture may not have a unique solution of each species concentration. Gas chromatography separates species in time, so that only one or a few species pass through the scanning spectroscopic analysis instrument at any point in time. By reducing the number of species at a time, the spectral analysis can, with high probability, identify and quantify each species correctly. In typical GC apparatus, the GC is tuned to separate species in time as completely as possible with high time resolution, thus identifying the species by time, so that the gas measurement downstream (FID, MS) only needs to quantify, not to identify each species. When MS is employed, it is generally a so-called hard ionization MS, which fragments the incoming compounds substantially. In this case, the GC is the primary method of compound discrimination. The MS detector has only poor discrimination, removing any remaining uncertainty in species identification if more than one species exits the GC column at the same time. In the combination GC/CRDS (or another high-resolution optical spectroscopy), the roles are reversed: the spectroscopy accounts for most of the identification of species, and the GC merely resolves the residual species uncertainty. Thus, in GC/CRDS, the GC part need not separate the species with high time resolution, unlike typical GC applications. Therefore, the GC column can be relatively short or small, and run quickly. Typical GC elution times are 30-300 minutes to achieve substantial species time separation, but with GC/CRDS, elution times of 1-30 minutes are typically adequate.

The example of FIG. 3 includes a GC column 306 inside a heater module 308, which is controlled by a controller 110 (which optionally includes computer control). The GC column contains adsorbent material, usually a packed powder, similar to the TD tube, but its purpose is to slow the progression of species in the gas flowing through it, to a rate less than the carrier gas, and different for each species depending on the properties of each species, to achieve separation in time. The GC column may alternatively be in the form of a long, thin "column" with adsorbent material coated on the inside. To inject sample species in the GC column, a volume of sample gas is flowed through the GC column at low temperature so as to collect relevant species on the adsorbent. Following injection, species emerge from the tube at different times, depending upon their adhesion to the coating of the material in the GC column. This process of species moving through the GC column and exiting it is called "elution." This flow with species separated in time passes to the scanning spectroscopic analysis instrument 102, with an optional gas filter 112 upstream to prevent particulate matter or a sub-class of gas species from contaminating the gas analyzer or interfering with its measurement. In some embodiments, the GC column is held at a constant temperature. In other embodiments, the GC column is heated, usually slowly so that less adsorbent species travel faster first and exit the GC column first, and then more adsorbent species travel fast later and exit the tube later.

FIG. 3 also shows the gas tubing, valves, and temperature control needed to effect the actions described in the previous paragraph. The parts include the GC column 306 in a temperature-controlled heater module 308, a valve S1 at the sample inlet end of the GC column, an optional particle filter 112, and the scanning spectroscopic analysis instrument 102. The gas transfer line from the GC column to the instrument, including the filter, may optionally be heated (e.g., with heater 120) to prevent condensation of the species in the transfer line and filter, thus improving the delivery efficiency of the species to the analyzer. A single cycle of action typically includes the following steps (other steps are possible and some steps may be repeated in a single cycle):

1) stabilize the temperature of the GC column to a temperature appropriate for adsorption;
2) inject (adsorb) sample in the GC column;
3) flush GC column with clean carrier gas;
4) ramp temperature up so as to elute species from GC column, and measure eluted species with scanning spectroscopic analysis instrument;
5) hold GC column at high temperature to continue to elute and measure species, and clean out tube; and
6) cool down GC column in preparation for next cycle. Further considerations for these steps follow.

Stabilize temperature: S1 is switched so that the sample gas is blocked, and the carrier gas flows through the GC column and continues to the scanning spectroscopic analysis instrument. The temperature controller, typically an electronic proportional-integral-differential (PID) control device, adjusts power to a heater and/or cooler in the heater module as to stabilize the temperature at a specific low value to be used for injection (adsorbing) sample species in the next step. In one possible implementation, the temperature must remain stable at the target temperature within a specified tolerance for a specified minimum time before progressing to the next step.

Inject sample: At the beginning of this step, S1 is switched so that the sample gas now flows into and through the GC column. Sample species are adsorbed inside the GC column. Injection continues for a specified amount of time. The temperature controller continues to maintain the temperature of the GC heater module at the same set point throughout the injection step. The injection gas volume, the value of which is used to compute the species concentrations, is equal to the sample gas flow rate multiplied by the injection time.

Flush GC column: At the beginning of this step, S1 is switched so that the sample gas is blocked from the GC column, and the carrier gas flows through the GC column and continues to the scanning spectroscopic analysis instrument. The temperature controller continues to maintain the temperature of the GC heater module at the same set point throughout the flush step. The flush continues for a specified time (typically about one minute) to clear the remaining sample gas from the GC column, replacing it with the carrier gas, preferably all the way to the scanning spectroscopic analysis instrument. The temperature is maintained at the same low temperature as in the injection step.

Elute sample: During the elute step, S1 stays switched so that the sample gas is still blocked from the GC column, and the carrier gas continues through the GC column and to the scanning spectroscopic analysis instrument. The temperature controller ramps the temperature of the GC heater module starting at the injection temperature and increasing to a high temperature typically in the range 100-300 C. The set point temperature versus time is pre-programmed, either within the temperature controller by a computer communicating with the temperature controller. The temperature ramp rate determines how fast species elute and how well separated in time they elute. As stated above, the elution of the invention may be substantially faster than is typical of GC systems, and each species elution may overlap with the elution of neighboring species in time.

High-temperature clean-out: At the end of the elute step, the GC heater module temperature is at some high value. During the high-temperature clean-out step, the GC heater module is held at this same high temperature, or another high temperature for a specified amount of time. Elution of species continues, and S1 stays in the same state so that the carrier gas flows through the GC column and continues to the scanning spectroscopic analysis instrument. This step is typically chosen to last long enough to elute all of the species from the GC column, so that the GC column is "clean", e.g. has minimal remaining species still adsorbed, that may interfere with the gas measurement of the next cycle (e.g. desorb during the next cycle). This step may occur more than once in a cycle, with additional steps having a different temperature from the initial clean-out step, optionally preceded by a temperature ramp step (similar to elute step).

Cool down: After the clean-out step, the GC column needs to be cooled down in preparation for the next cycle. During this step, a cooling mechanism such as a fan or thermoelectric cooler integral with the heater module is turned on to cool down the heater module and GC column inside it. The temperature controller may regulate the dropping temperature, such as a programmed temperature ramp, or simply allow cooling as rapidly as possible. This step may have a specified time duration and the temperature controller may begin to stabilize the temperature at the low value specified in the "Stabilize temperature" step, or this step may be programmed to end when the temperature reaches a specified low temperature value (either that of the "stabilize temperature" step or another low temperature).

After the Cool down step ends, the cycle begins anew with the Stabilize temperature step. Cycles continue until the user or computer instructs the cycles to stop, either immediately or at the end of a current cycle. If instructed to stop immediately, the valve and temperature controller are put in an idle state, equivalent to the Stabilize temperature step, but without temperature control and with the heater module turned off.

The above description of cycle steps is merely an example. Depending on specific needs of the application, the above defined steps (with same or different timing or temperature or other parameters) may be added or deleted, rearranged, or new types of steps defined and inserted. For example, the first clean out step may be followed by an additional ramp step and clean out step, or there may be two or more injection steps drawing from different incoming samples.

Some optional additions exist to the design and operation of the GC embodiment. The most basic is flow control for the gases. Flow control may be implemented with a mass flow controller (MFC), an active device that monitors the flow and adjusts it continuously, or a flow orifice, a passive device through which the flow is nominally proportional to the gas pressure at its inlet. Flow control by either of these methods (or any other flow control method) may be applied to either or both the sample flow during injection and the carrier gas flow during elution. In addition, to maintain a fresh, real-time delivery of sample gas to the invention, the invention may include a bypass gas line to direct the incoming sample to exhaust during all cycle steps other than injection. This bypass flow may also have flow control, and this flow control may be the same device as used for the injection flow control, achieved with appropriate gas valves.

Figure 4:
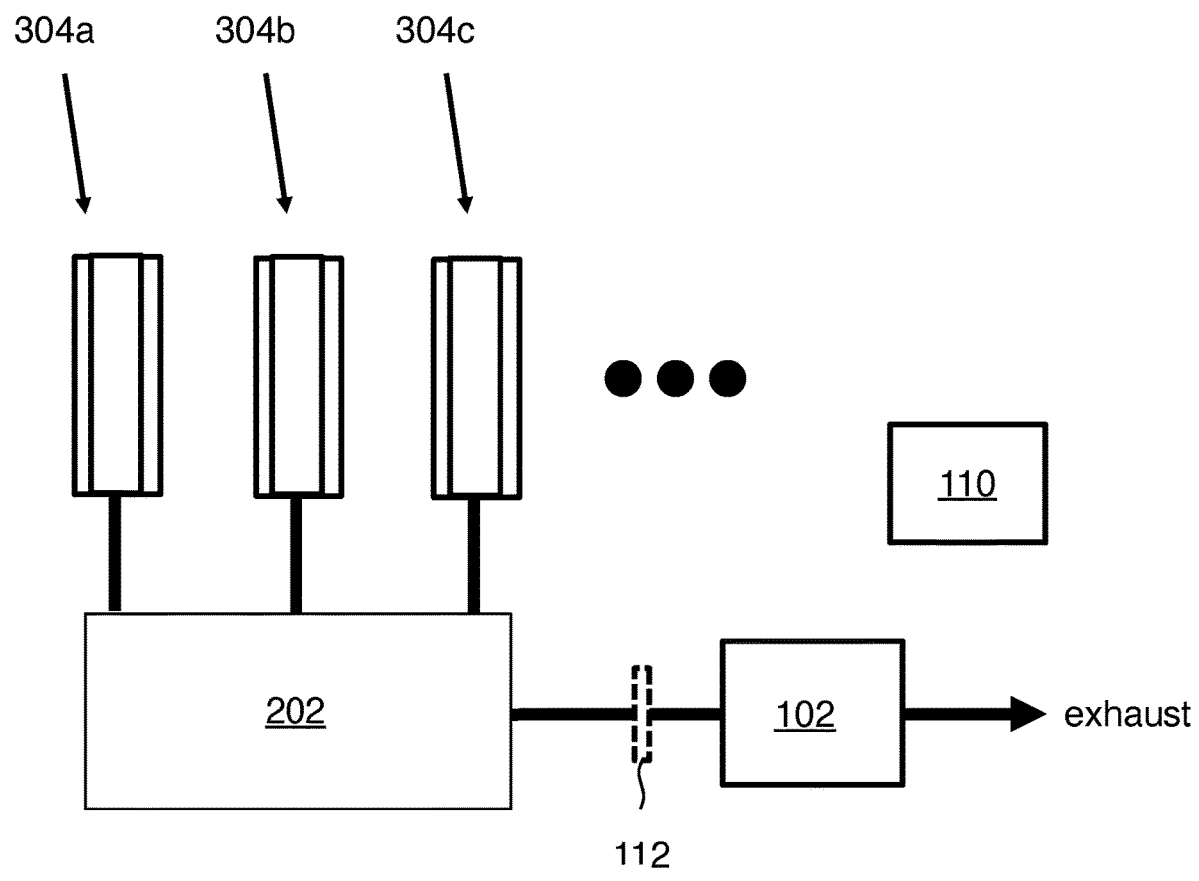
FIG. 4 shows an example of multiplexing the embodiment of FIG. 3.

In some embodiments, multiplexing is done to allow one gas analysis instrument to make use of several gas chromatography units. The gas chromatography units can have the same gas sample input, distinct gas sample inputs or any combination of same and distinct gas sample inputs. FIG. 4 shows an example. Here 304*a*, 304*b*, 304*c* etc. are gas chromatography units, and gas flow manifold 202 can switch the gas flows to connect gas analysis instrument 102 to any of these gas chromatography units. The remainder of the gas plumbing is not shown here, since the principles of this plumbing are shown on FIG. 3.

Figure 5:
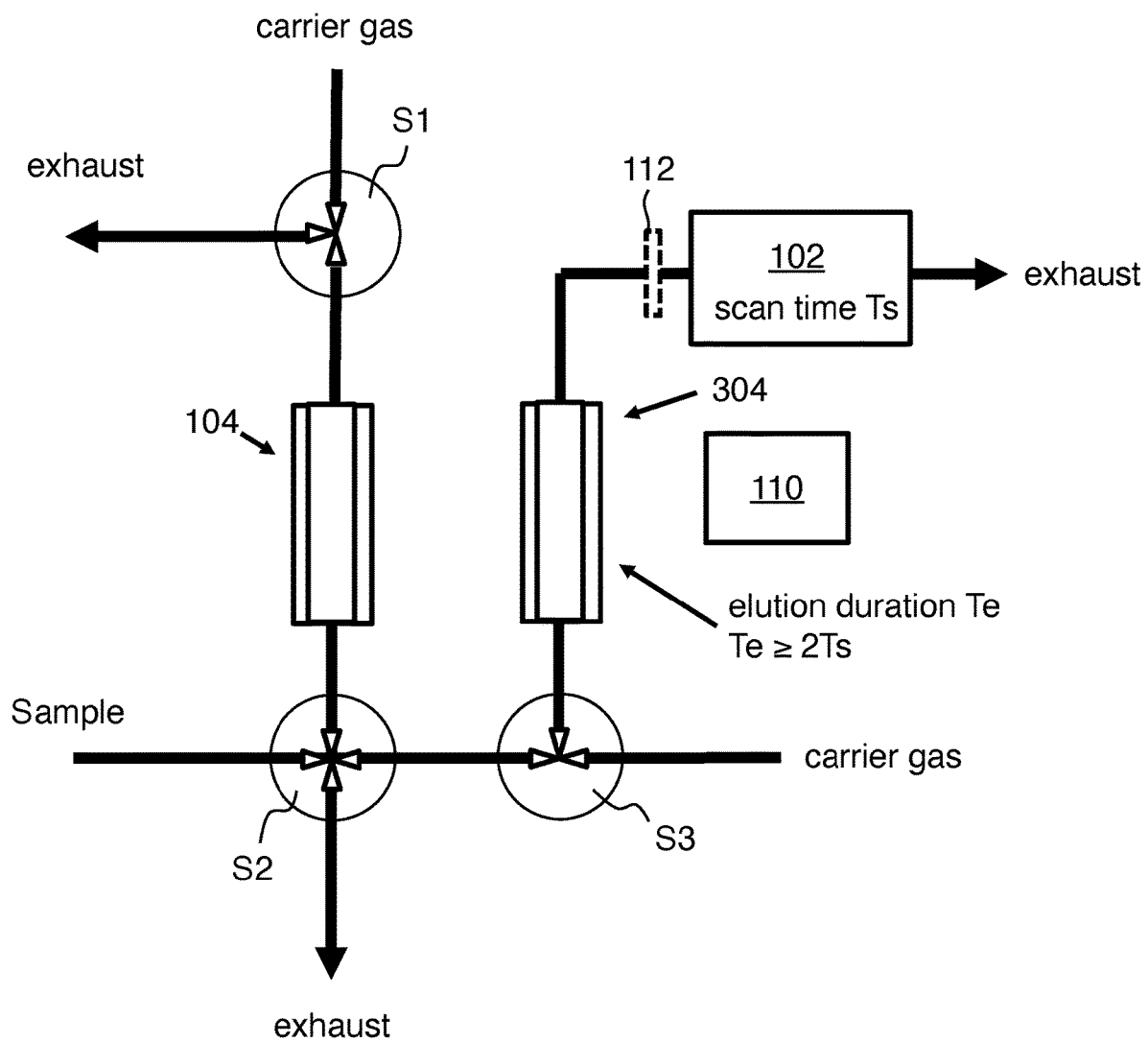
FIG. 5 shows an exemplary embodiment of the invention including both a sample preconcentrator and a gas chromatography unit.

In some embodiments, sample preconcentration is employed in connection with gas chromatography according to the above-described principles. The simplest case, shown on FIG. 5, is where gas chromatography having $T_e \geq 2Ts$ is combined with conventional sample preconcentration. Here S1, S2, S3 are gas flow control switches.

Some basic operating modes are as follows. In the adsorption mode S1 connects sample preconcentrator 104 to vacuum, S2 connects sample preconcentrator 104 to the sample input, and S3 connects gas chromatography unit 304 to the carrier gas source. In the desorption mode, S1 connects sample preconcentrator 104 to the carrier gas source, S2 connects sample preconcentrator 104 to S3, and S3 connects gas chromatography unit 304 to S2. Further considerations relating to combined TD and GC embodiments follow.

In these embodiments, the TD tube and GC column each have their own cycles, which are partially linked and synchronized. The GC column is contained in a heater module with a PID controller, itself optionally controlled by a computer. The pre-concentrated sample in carrier gas is initially injected into the GC column from the TD tube, and then a carrier gas (typically N2, Ar, He) flows through the GC column in the same direction as the sample was loaded. The GC column is heated to cause the adsorbed species to elute out of the GC column.

For an exemplary single sample acquisition, the combined TD-GC cycle can be as follows:
 1) stabilize the temperature of the TD tube;
 2) trap sample in the TD tube;
 3) flush TD tube with clean carrier gas;
 4) ramp temperature so as to desorb species from TD tube, and transfer the desorbed sample to the GC column;
 5) hold TD at high temperature to continue to desorb and transfer sample, and clean out tube; optionally stop transferring sample, isolate GC column from TD tube, and start eluting sample from GC column to scanning spectroscopic analysis instrument with programmed temperature ramp;

6) cool down TD tube in preparation for the next cycle while eluting sample from GC column to scanning spectroscopic analysis instrument with programmed temperature ramp;
7) hold GC column at high temperature to clean out tube; optionally start next TD tube cycle; and
8) cool down GC column in preparation for the next cycle; continue next TD tube cycle. Further considerations relating to these steps follow.

TD stabilize temperature: The valves S1, S2, S3, are switched so that the sample gas is blocked, and the carrier gas flows through the TD tube and continues to the vacuum beyond valve S1, and carrier gas flows through the GC column to the gas analyzer. The temperature controller, typically an electronic proportional-integral-differential (PID) control device, adjusts power to a heater and/or cooler in the heater module as to stabilize the temperature at a specific low value to be used for trapping in the next step. In one implementation, the temperature must remain stable at the target temperature within a specified tolerance for a specified minimum time before progressing to the next step.

TD trap sample: At the beginning of this step, valves S1, S2, S3 are switched so that the sample gas now flows into and through the TD tube and out to the vacuum pump that pulls the sample gas through the entire train. Optional flow control (e. g. orifice or MFC) may be located between valve S1 and the vacuum pump. Trapping continues for a specified amount of time. The temperature controller continues to maintain the temperature of the TD heater module at the same set point throughout the trapping step. The trapping gas volume, the value of which is used to compute the species concentrations, is equal to the flow rate, set and measured by an MFC or other flow sensor (if present), multiplied by the trapping time.

Flush TD tube: At the beginning of this step, valves S1, S2, S3 are switched so that the sample gas again is blocked (or bypassed as in FIG. 1), and the carrier gas flows through the TD tube and continues to the vacuum pump beyond valve S2. The temperature controller continues to maintain the temperature of the TD heater module at the same set point throughout the flush step. The flush continues for a specified time (typically about one minute) to clear the remaining sample gas from the TD tube, replacing it with the carrier gas. The temperature is maintained at the same low temperature as in the trapping step.

TD desorb sample: During the desorb step, the valves S1, S2, S3 are switched so that the sample gas is still blocked or continues to the bypass and the carrier gas continues through the TD tube and to the input of the GC column, and eventually through the GC column to the gas analyzer. The TD temperature controller ramps the temperature of the TD heater module starting at the trap temperature and increasing to a high temperature typically in the range 100-300 C. The set point temperature versus time is pre-programmed, either within the temperature controller by a computer communicating with the temperature controller. The temperature ramp in the TD-GC combination may be fast to desorb the species quickly, using the smallest volume of carrier gas possible (e. g. shortest time), or relatively slow to create moderately long desorption pulse, since the optical spectroscopy of the gas analyzer does not require species to be well resolved in time, and may require a minimum pulse length to acquire an accurate spectrum. The GC column temperature controller holds the GC column temperature at a low "injection" temperature so that sample species are adsorbed primarily near the input of the GC column.

TD high-temperature clean-out: At the end of the desorb step, the TD heater module temperature is at some high value. During the high-temperature clean-out step, the TD heater module is held at this same high temperature, or another high temperature for a specified amount of time. Desorption of species continues, and the valves can stay in the same state so that the carrier gas flows through the TD tube and continues to GC column. This step is typically chosen to last long enough to desorb all of the species from the TD tube, so that the TD tube is "clean", e. g. has minimal remaining species still adsorbed, that may interfere with the gas measurement of the next cycle (e. g. desorb during the next cycle). This step may occur more than once in a cycle, with for example, a different temperature from the initial clean-out step, optionally preceded by a temperature ramp step (similar to desorb step).

GC elution: The GC column can switch to its elution step at any time during the TD clean-out step or TD cool down step. This switch to elution entails switching S2 so that the carrier from the TD tube exits to the vacuum pump, and switching S3 so that fresh carrier gas flows to the GC column inlet and continues to the gas analyzer. The GC column temperature controller ramps the temperature of the GC heater module starting at the injection temperature and increasing to a high temperature typically in the range 100-300 C. Optionally after the ramp, the temperature remains at a constant high temperature to clean out the GC column and elution continues during this temperature plateau. The set point temperature versus time is pre-programmed, either within the temperature controller by a computer communicating with the temperature controller. The temperature ramp is slow so that different species elute separately in time at the exit of the GC column, to provide some species discrimination. As described earlier, this separation need not be complete since the gas analyzer optical spectroscopy accomplishes most of the species discrimination. GC elution continues through the remainder of the TD clean-out step and into the TD cool down step. It may continue throughout the TD cooldown step and into the next TD cycle.

TD cool down: After the clean-out step, the TD tube needs to be cooled down in preparation for the next cycle. During this step, a cooling mechanism such as a fan or thermoelectric cooler integral with the heater module is turned on to cool down the heater module and TD tube inside it. The temperature controller may regulate the dropping temperature, such as a programmed temperature ramp, or simply allow cooling as rapidly as possible. This step may have a specified time duration and the temperature controller may begin to stabilize the temperature at the low value specified in the "TD stabilize temperature" step, or this step may be programmed to end when the temperature reaches a specified low temperature value (either that of the "stabilize temperature" step or another low temperature). Valves S1 and S2 are switched such that carrier gas flows though the TD tube during this step. S3 is switched such that carrier gas flows though the GC column and the analysis instrument to complete the elution.

GC cool down: After the GC column is cleaned out (the second phase of the GC elution step), the GC column needs to be cooled down in preparation for the next cycle. GC cool down begins and ends during the TD cool down, TD stabilize temperature, TD trap, or TD flush steps. The GC cool down beginning and ending may occur during different TD cycle steps, not necessarily the same step, dependent on the time required for GC elution and GC cool down. During GC cool down, a cooling mechanism such as a fan or thermo-electric cooler integral with the heater module is turned on to cool down the heater module and GC column inside it. The temperature controller may regulate the dropping temperature, such as a programmed temperature ramp, or simply allow cooling as rapidly as possible. This step may have a specified time duration and the temperature controller may begin to stabilize the temperature at the low value specified in the GC injection, or this step may be programmed to end when the temperature reaches a specified low temperature value (either the injection temperature or another low temperature). Valves S1, S2, S3 are switched such that carrier gas flows through the GC column in this step. GC cool down and stabilization at the GC injection temperature needs to finish before the TD cycle advances to the TD desorption step. To ensure this condition, the computer may monitor the temperature of the GC column and wait for it to stabilize before instructing the valves and TD PID to advance to the TD desorption step.

Figure 6:
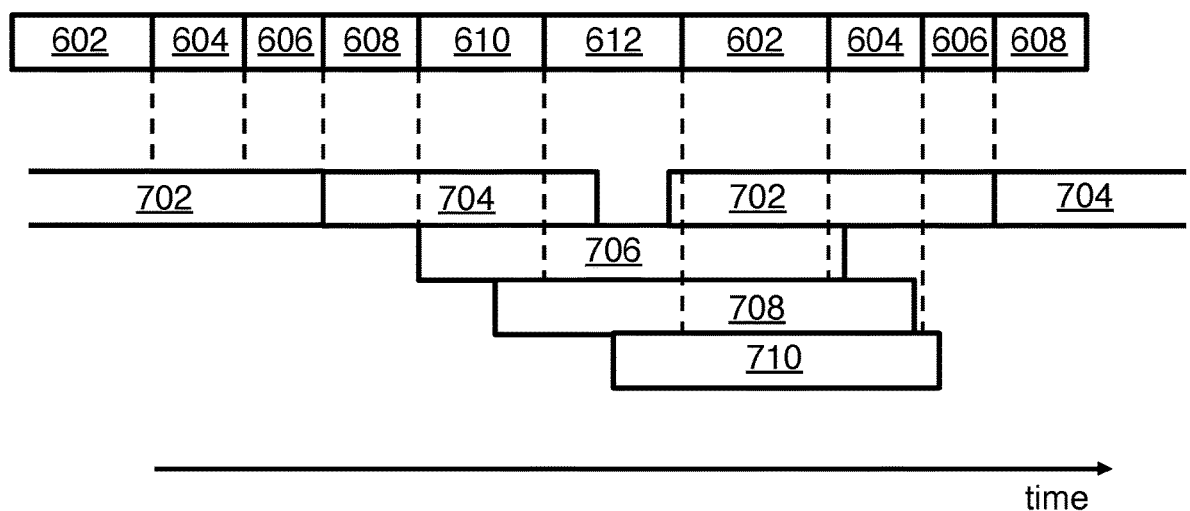
FIG. 6 shows an exemplary timing diagram for the example of FIG. 5.

As indicated by operation of the example of FIG. 5, it is possible, and often preferred in practice, to efficiently combine steps that can be performed simultaneously, such as cleaning out the gas chromatography unit while the sample preconcentrator is in the adsorption mode. FIG. 6 shows more explicitly how this timing overlap may be accomplished. The top part of this figure shows the sample preconcentration (PC) cycle and the bottom part of the figure shows the gas chromatography (GC) cycle. In particular, 602 is PC temperature stabilization, 604 is PC sample trapping, 606 is PC flush, 608 is PC desorption, 610 is PC clean out, and 612 is PC cool down. Similarly, 702 is GC temperature stabilization, 704 is GC sample capture, 706 is GC elution, 708 is GC clean out and 710 is GC cool down.

More specifically, the TD steps are shown in sequence in time. The GC steps are shown as boxes extending from the earliest possible start time to the latest possible end time of each step, relative to the TD steps and transitions (dashed vertical lines). Steps are not shown to scale, and simply show the range of which TD steps the GC steps can start or end within. For example, the GC step "clean out" can start during any of the TD steps "clean out" through "trap sample" and can end at any time during the same range of TD steps. Normally, the transition between GC steps "stabilize temperature" and "capture sample" is synchronized with the transition between TD steps "flush" and "desorb". Note that the TD cleanout step may be considered an extension of the desorb step (only at a fixed temperature), and the GC cleanout step may be considered an extension of the elute step (only at a fixed temperature).

The invention claimed is:

1. Apparatus for performing gas analysis, the apparatus comprising:
   a gas analysis instrument based on optical absorption spectroscopy, wherein the gas analysis instrument performs a spectral scan in a scan time $T_s$;
   a sample preconcentrator having an adsorption mode and a desorption mode;
   a controller configured to at least switch between the adsorption mode and desorption mode of the sample preconcentrator;
   wherein the adsorption mode includes receiving an input gas sample and adsorbing one or more constituents of the input gas sample to collect one or more adsorbed species;
   wherein the desorption mode includes heating the sample preconcentrator to release at least some of the one or more adsorbed species to provide a preprocessed gas sample;
   wherein the preprocessed gas sample is provided to the gas analysis instrument in a desorption time $T_d$;
   wherein $T_d$ is at least $2T_s$.

2. The apparatus of claim 1, wherein the desorption time $T_d$ is controlled by controlling a temperature ramp rate of the desorption mode.

3. The apparatus of claim 1, wherein the apparatus is configured to provide enhanced concentration of an analyte species to the gas analysis instrument with the sample preconcentrator.

4. The apparatus of claim 1, wherein the apparatus is configured to reduce concentrations of one or more interfering gas species provided to the gas analysis instrument using the sample preconcentrator.

5. The apparatus of claim 1, wherein the gas analysis instrument is based on a spectroscopy selected from the group consisting of: cavity enhanced absorption spectroscopy, optical-feedback cavity enhanced absorption spectroscopy, cavity ring-down spectroscopy, tunable diode laser absorption spectroscopy, integrated cavity output spectroscopy, and off-axis integrated cavity output spectroscopy.

6. The apparatus of claim 1, wherein the sample preconcentrator includes an adsorption/desorption medium selected from the group consisting of: porous polymers, graphitized carbons and carbon molecular sieves.

7. The apparatus of claim 1, wherein the adsorption mode includes cooling part or all of the sample preconcentrator to enhance adsorption of the one or more adsorbed species.

8. The apparatus of claim 1, wherein the apparatus is configured to measure input sample gas during the adsorption mode with the gas analysis instrument.

9. The apparatus of claim 1, further comprising one or more additional gas detectors configured to receive gas from the sample preconcentrator.

10. The apparatus of claim 1, wherein the apparatus is configured to provide one or more further sample preconditioning operations selected from the group consisting of: ozone removal, humidity removal, and selective removal of one or more interfering species with gas-selective membranes.

11. The apparatus of claim 1, further comprising one or more additional sample preconcentrators, wherein the controller is configured to connect an input of the gas analysis instrument to the sample preconcentrator or to any of the one or more additional sample preconcentrators, thereby providing multiplexing.

12. The apparatus of claim 1, wherein the apparatus further includes one or more devices that measure gas flow.

13. The apparatus of claim 1, wherein the apparatus further includes one or more fixed gas flow restrictions to provide gas flow control.

14. The apparatus of claim 1, wherein the controller is configured to provide one or more carrier gases for sample handling.

15. The apparatus of claim 1, wherein the controller is configured to provide one or more calibration gases to the sample preconcentrator.

16. The apparatus of claim 1, wherein the controller is configured to bypass a sample input to an exhaust line except during the adsorption mode, and is configured to provide the sample input to the sample preconcentrator during the adsorption mode.

17. The apparatus of claim 1, wherein a gas line connecting the sample preconcentrator to the gas analysis instrument is heated.

18. The apparatus of claim 1, wherein the controller provides a pressurized sample inlet.

19. A method for performing gas analysis, the method comprising:
- performing optical absorption spectroscopy with a gas analysis instrument, wherein the gas analysis instrument performs a spectral scan in a scan time $T_s$;
- collecting an input sample gas with a sample preconcentrator having an adsorption mode and a desorption mode;
- wherein the adsorption mode includes receiving the input gas sample and adsorbing one or more constituents of the input gas sample to collect one or more adsorbed species;
- wherein the desorption mode includes heating the sample preconcentrator to release at least some of the one or more adsorbed species to provide a preprocessed gas sample;
- switching between the adsorption mode and desorption mode of the sample preconcentrator with a controller;
- wherein the preprocessed gas sample is provided to the gas analysis instrument in a desorption time $T_d$;
- wherein $T_d$ is at least $2T_s$.

20. The method of claim 19, further comprising controlling a temperature ramp rate of the desorption mode to control the desorption time $T_d$.

21. The method of claim 19, further comprising providing enhanced concentration of an analyte species to the gas analysis instrument with the sample preconcentrator.

22. The method of claim 19, further comprising reducing concentrations of one or more interfering gas species provided to the gas analysis instrument using the sample preconcentrator.

23. The method of claim 19, wherein the optical absorption spectroscopy is selected from the group consisting of: cavity enhanced absorption spectroscopy, optical-feedback cavity enhanced absorption spectroscopy, cavity ring-down spectroscopy, tunable diode laser absorption spectroscopy, integrated cavity output spectroscopy, and off-axis integrated cavity output spectroscopy.

24. The method of claim 19, wherein the sample preconcentrator includes an adsorption/desorption medium selected from the group consisting of: porous polymers, graphitized carbons and carbon molecular sieves.

25. The method of claim 19, further comprising cooling part or all of the sample preconcentrator to a sub-ambient temperature during the adsorption mode to enhance adsorption of the one or more adsorbed species.

26. The method of claim 19, wherein the input sample gas is measured during the adsorption mode with the gas analysis instrument.

27. The method of claim 19, further comprising providing gas from the sample preconcentrator to one or more additional gas detectors.

28. The method of claim 19, further comprising performing one or more further sample preconditioning operations selected from the group consisting of: ozone removal, humidity removal, and selective removal of one or more interfering species with gas-selective membranes.

29. The method of claim 19, further comprising collecting one or more additional gas samples with one or more additional sample preconcentrators, wherein the controller is configured to connect an input of the gas analysis instrument to the sample preconcentrator or to any of the one or more additional sample preconcentrators, thereby providing multiplexing.

30. The method of claim 19, further comprising measuring one or more gas flows.

31. The method of claim 19, wherein one or more fixed gas flow restrictions is present to provide gas flow control.

32. The method of claim 19, further comprising providing one or more carrier gases for sample handling.

33. The method of claim 19, further comprising providing one or more calibration gases to the sample preconcentrator.

34. The method of claim 19, further comprising:
- bypassing a sample input to an exhaust line except during the adsorption mode; and
- providing the sample input to the sample preconcentrator during the adsorption mode.

35. The method of claim 19, further comprising heating a gas line connecting the sample preconcentrator to the gas analysis instrument.

36. The method of claim 19, further comprising pressurizing a sample inlet.

* * * * *